(12) United States Patent
Moore et al.

(10) Patent No.: US 9,558,473 B2
(45) Date of Patent: Jan. 31, 2017

(54) COLLABORATIVE CONTACT MANAGEMENT

(75) Inventors: Martin T. Moore, Somerville, MA (US); Brian D. Goodman, Norwalk, CT (US); Frank L. Jania, Chapel Hill, NC (US); James K. Kebinger, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 2746 days.

(21) Appl. No.: 11/295,082

(22) Filed: Dec. 6, 2005

(65) Prior Publication Data

US 2007/0130256 A1 Jun. 7, 2007

(51) Int. Cl.
G06F 15/16 (2006.01)
G06Q 10/10 (2012.01)
H04M 3/42 (2006.01)

(52) U.S. Cl.
CPC .................... G06Q 10/10 (2013.01)

(58) Field of Classification Search
USPC ........................................ 709/203
See application file for complete search history.

(56) References Cited

U.S. PATENT DOCUMENTS

| | | |
|---|---|---|
| 5,715,444 A | 2/1998 | Danish et al. |
| 5,896,321 A | 4/1999 | Miller et al. |
| 6,208,339 B1 | 3/2001 | Atlas et al. |
| 6,377,965 B1 | 4/2002 | Hachamovitch et al. |
| 6,539,421 B1 | 3/2003 | Appelman et al. |
| 6,564,213 B1 | 5/2003 | Ortega et al. |
| 6,697,840 B1 | 2/2004 | Godefroid et al. |
| 2002/0099777 A1 | 7/2002 | Gupta et al. |
| 2003/0065721 A1* | 4/2003 | Roskind ................. 709/204 |
| 2004/0070627 A1* | 4/2004 | Shahine et al. ............ 345/794 |
| 2005/0041793 A1* | 2/2005 | Fulton et al. .......... 379/211.01 |
| 2005/0108344 A1 | 5/2005 | Tafoya et al. |
| 2010/0183125 A1* | 7/2010 | Hayes et al. ............ 379/88.01 |
| 2011/0167116 A1* | 7/2011 | Kucharewski et al. ...... 709/204 |

OTHER PUBLICATIONS

Landon, "Deploying Lotus Sametime on the eServer iSeries Server", Jun. 2002, Redbooks.*

(Continued)

*Primary Examiner* — Chris Parry
*Assistant Examiner* — Alan S Chou
(74) *Attorney, Agent, or Firm* — Ed Choi; Hoffman Warnick LLC (57) ABSTRACT

A solution for managing a set of collaborative contacts is provided. Each collaborative contact includes one or more collaboration capabilities, each of which corresponds to a unique collaboration tool (e.g., voice over IP, instant messaging, email, and/or the like). Identifying text can be used to search the set of collaborative contacts and obtain a set of candidate contacts. An availability status for each collaboration capability of each candidate contact can be requested and a display can be generated that includes the set of candidate contacts. In one embodiment, the display can include an indication of the collaboration capabilities for one or more of the candidate contacts, and/or the availability status for one or more collaboration capabilities. A user can use the display to request a collaboration session between the user and one or more of the candidate contacts.

18 Claims, 5 Drawing Sheets

(56) References Cited

OTHER PUBLICATIONS

Rouleau, A., "Eudora Email User Manual for Windows, Version 5.2," pp. 1-353, 2002.
"Using Your Yahoo! Address Book From Messenger," printed from http://help.yahoo.com/plus/tutorials/ms7/im_ab1.html on Dec. 6, 2005.

\* cited by examiner

FIG. 2

COLLABORATIVE CONTACT MANAGEMENT

FIELD OF THE INVENTION

The invention relates generally to electronic collaboration, and more particularly, to a solution for managing a set of collaborative contacts.

BACKGROUND OF THE INVENTION

Digital communication is the backbone of electronic collaboration. To this extent, various digital communication solutions, such as e-mail, instant messaging, voice-over internet protocol (VoIP), and the like, are becoming increasingly important to communications. With the increasing usage and ease with which interactions with others takes place, an individual can accumulate a large number of contacts, e.g., hundreds or thousands. Many solutions provide an ability for the user to manage these contacts for a particular collaborative tool.

However, navigating and/or initiating collaboration with one or more of these contacts can be time consuming, especially when using a collaborative tool in which a contact may be littered in different contexts, groups, and annotations. Current solutions enable a user to provide information on an individual that is desired to be contacted and display a first search result and/or a list of search results in a window. Similarly, some solutions provide a type-ahead search in which a list of names is displayed and pruned with each keystroke. Even with these solutions, locating a contact can be a time consuming task.

In view of the foregoing, there exists a need in the art to overcome one or more of the deficiencies indicated herein.

BRIEF SUMMARY OF THE INVENTION

The invention provides a solution for managing a set of collaborative contacts. Each collaborative contact includes one or more collaboration capabilities, each of which corresponds to a unique collaboration tool (e.g., voice over IP, instant messaging, email, and/or the like). Identifying text can be used to search the set of collaborative contacts and obtain a set of candidate contacts. An availability status for each collaboration capability of each candidate contact can be requested and a display can be generated that includes the set of candidate contacts. In one embodiment, the display can include an indication of the collaboration capabilities for one or more of the candidate contacts, and/or the availability status for one or more of the collaboration capabilities. A user can use the display to request a collaboration session between the user and one or more of the candidate contacts. Further, the invention can integrate multiple collaboration tools as part of conducting the collaboration session. In this manner, the invention provides an improved solution that can be used as a single location for managing contact information for numerous collaborative contacts and/or collaboration tools. Additionally, the invention can be implemented as part of a solution that integrates use of several collaboration tools.

A first aspect of the invention provides a method of managing a set of collaborative contacts, the method comprising: obtaining identifying text; obtaining a set of candidate contacts from the set of collaborative contacts using the identifying text, each candidate contact including a set of collaboration capabilities, each collaboration capability corresponding to a unique collaboration tool; requesting an availability status for each collaboration capability of each candidate contact; and generating a display that includes the set of candidate contacts.

A second aspect of the invention provides a system for managing a set of collaborative contacts, the system comprising: a system for obtaining a set of candidate contacts from the set of collaborative contacts, each candidate contact including at least one of a plurality of collaboration capabilities, each collaboration capability corresponding to a unique collaboration tool; a system for requesting an availability status for each collaboration capability of each candidate contact; and a system for generating a display that includes the set of candidate contacts.

A third aspect of the invention provides a program product stored on a computer-readable medium, which when executed, enables a computer infrastructure to manage a set of collaborative contacts, the program product comprising computer program code for enabling the computer infrastructure to: obtain identifying text for the collaborative contact; obtain a set of candidate contacts from the set of collaborative contacts using the identifying text, each candidate contact including a set of collaboration capabilities, each collaboration capability corresponding to a unique collaboration tool; request an availability status for each collaboration capability of each candidate contact; and generate a display that includes the set of candidate contacts.

A fourth aspect of the invention provides a method of generating a system for managing a set of collaborative contacts, the method comprising: providing a computer infrastructure operable to: obtain identifying text; obtain a set of candidate contacts from the set of collaborative contacts using the identifying text, each candidate contact including a set of collaboration capabilities, each collaboration capability corresponding to a unique collaboration tool; request an availability status for each collaboration capability of each candidate contact; and generate a display that includes the set of candidate contacts.

A fifth aspect of the invention provides a method, system, program product, and method of generating a system for integrating a plurality of collaboration tools, the invention comprising: obtaining a set of collaborative contacts from each of the plurality of collaboration tools; obtaining a set of selected contacts based on the set of collaborative contacts; and requesting a collaboration session with each selected contact in the set of selected contacts based on at least one of a set of collaboration capabilities and a corresponding set of availability statuses for each selected contact.

A sixth aspect of the invention provides a business method for managing a set of collaborative contacts and/or integrating a plurality of collaboration tools, the business method comprising managing a computer infrastructure that performs the process described herein; and receiving payment based on the managing.

The illustrative aspects of the present invention are designed to solve the problems herein described and other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for managing a set of collaborative contacts. Each collaborative contact includes one or more collaboration capabilities, each of which corresponds to a unique collaboration tool (e.g., voice over IP, instant messaging, email, and/or the like). Identifying text can be used to search the set of collaborative contacts and obtain a set of candidate contacts. An availability status for each collaboration capability of each candidate contact can be requested and a display can be generated that includes the set of candidate contacts. In one embodiment, the display can include an indication of the collaboration capabilities for one or more of the candidate contacts, and/or the availability status for one or more of the collaboration capabilities. A user can use the display to request a collaboration session between the user and one or more of the candidate contacts. Further, the invention can integrate multiple collaboration tools as part of conducting the collaboration session. In this manner, the invention provides an improved solution that can be used as a single location for managing contact information for numerous collaborative contacts and/or collaboration tools. Additionally, the invention can be implemented as part of a solution that integrates use of several collaboration tools. As used herein, unless otherwise noted, the term "set" means one or more.

Figure 1:
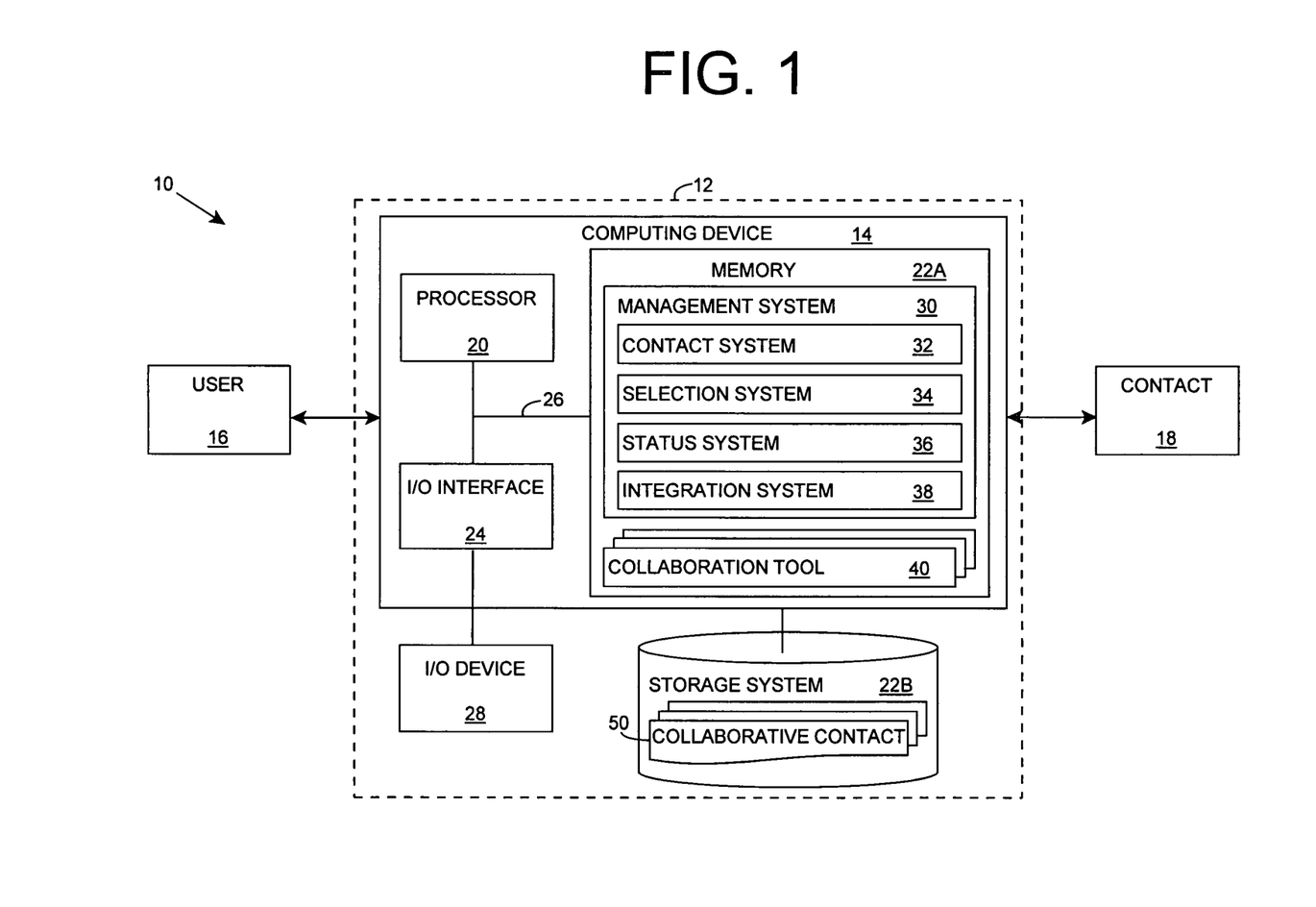
FIG. 1 shows an illustrative environment for managing a set of collaborative contacts according to an embodiment of the invention.

Turning to the drawings, FIG. 1 shows an illustrative environment 10 for managing a set of collaborative contacts 50 according to an embodiment of the invention. To this extent, environment 10 includes a computer infrastructure 12 that can perform the process described herein in order to manage collaborative contact(s) 50. In particular, computer infrastructure 12 is shown including a computing device 14 that comprises a management system 30, which makes computing device 14 operable to manage collaborative contact(s) 50 by performing the process described herein.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as management system 30, which is stored in memory 22A and/or storage system 22B. While executing computer program code, processor 20 can read and/or write data, such as collaborative contact 50, to/from memory 22A, storage system 22B, and/or I/O interface 24. Bus 26 provides a communications link between each of the components in computing device 14. I/O device 28 can comprise any device that enables an individual to interact with computing device 14 or any device that enables computing device 14 to communicate with one or more other computing devices using any type of communications link.

In any event, computing device 14 can comprise any general purpose computing article of manufacture capable of executing computer program code installed thereon (e.g., a personal computer, server, handheld device, etc.). However, it is understood that computing device 14 and management system 30 are only representative of various possible equivalent computing devices that may perform the process described herein. To this extent, in other embodiments, the functionality provided by computing device 14 and management system 30 can be implemented by a computing article of manufacture that includes any combination of general and/or specific purpose hardware and/or computer program code. In each embodiment, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over any type of communications link, such as a network, a shared memory, or the like, to perform the process described herein. Further, while performing the process described herein, one or more computing devices in computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

As discussed herein, management system 30 enables computer infrastructure 12 to manage a set of collaborative contacts 50. To this extent, management system 30 is shown including a contact system 32, a selection system 34, a status system 36, and an integration system 38. Operation of each of these systems is discussed further herein. However, it is understood that some of the various systems shown in FIG. 1 can be implemented independently, combined, and/or stored in memory for one or more separate computing devices that are included in computer infrastructure 12. Further, it is understood that some of the systems and/or functionality may not be implemented, or additional systems and/or functionality may be included as part of computer infrastructure 12.

Regardless, the invention provides a solution for managing collaborative contact(s) 50. In particular, contact system 32 can manage storage of collaborative contact(s) 50 and enable a user 16 to request various operations that can be performed on one or more of the set of collaborative contacts 50. In general, user 16 can comprise an individual. To this extent, contact system 32 can generate a user interface that enables user 16 to interactively request the various operations. However, it is understood that contact system 32 can interact with another system (not shown) that is used by user 16. Consequently, contact system 32 also can provide an application program interface (API) or the like, which enables another system to programmatically request the various operations.

In general, each collaborative contact 50 includes information on a contact 18 for user 16. For example, collaborative contact 50 can include a formal name, a nickname, a contact type, one or more groups, and/or the like for the corresponding contact 18. Further, each collaborative contact 50 includes information on how user 16 can collaborate with contact 18 using one or more collaborative tools 40. To this extent, collaborative contact 50 can include collaboration information such as an email address, a voice-over internet protocol (VOIP) telephone number, an instant messaging identifier, and/or the like, for the corresponding contact 18. It is understood that contact system 32 can store collaborative contact 50 using any type of storage organization solution, including, for example, one or more data files, one or more records in a database, and/or the like.

Figure 2:
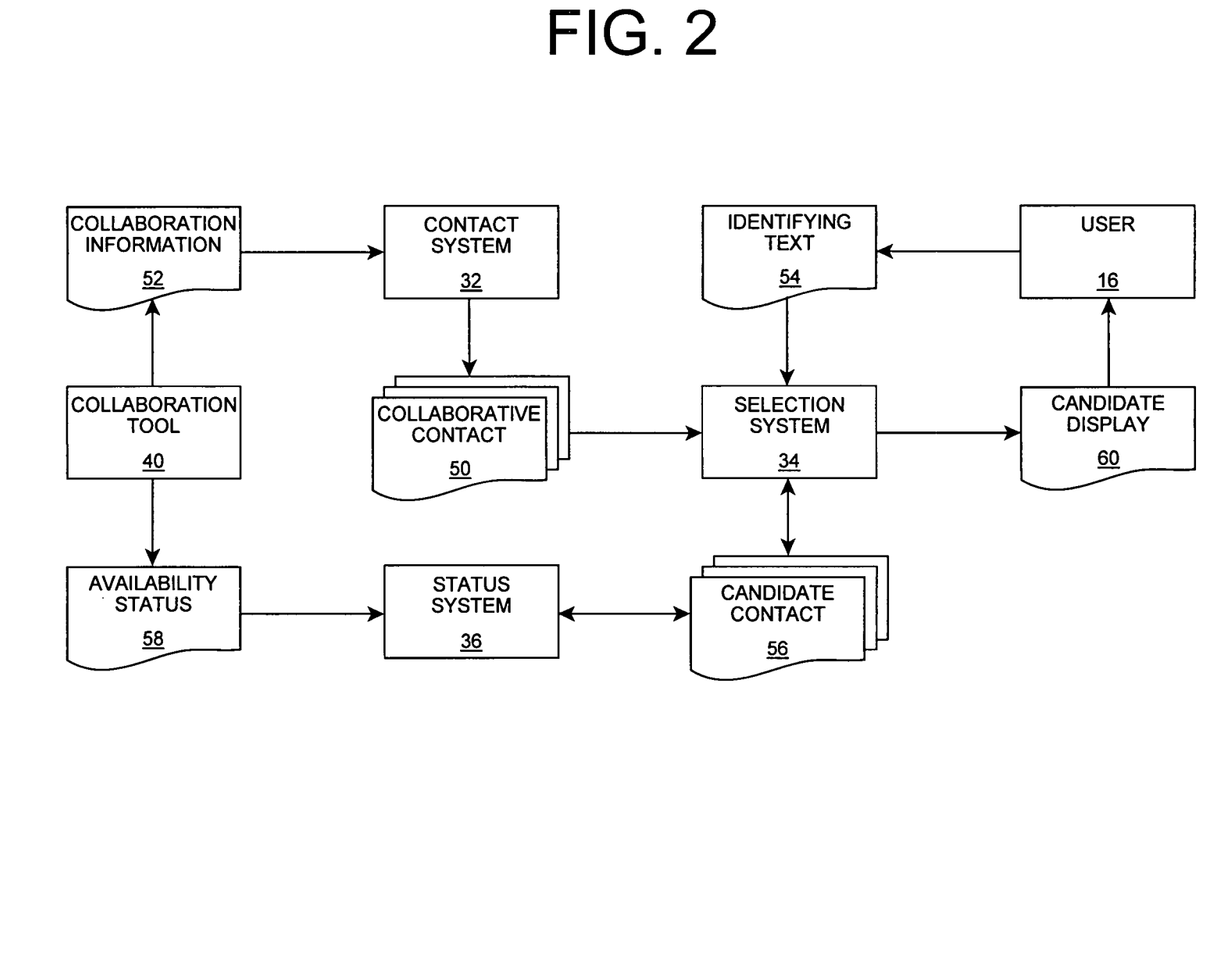
FIG. 2 shows an illustrative data flow diagram between the some of various systems shown in FIG. 1 according to an embodiment of the invention.

FIG. 2 shows an illustrative data flow diagram between some of the various systems shown in FIG. 1 according to an embodiment of the invention. As shown, contact system 32 can obtain/receive collaboration information 52 on a collaborative contact 50 from a collaboration tool 40. For example, when user 16 uses collaboration tool 40, he/she could request that collaboration information 52 for a contact 18 (FIG. 1) in collaboration tool 40 be added to the set of collaborative contacts 50. In any event, collaboration tool 40 can provide collaboration information 52 that is relevant to establishing a collaborative session with contact 18 using collaboration tool 40 (e.g., a telephone number for a VoIP collaboration tool 40). Further, collaboration information 52 can comprise additional information on contact 18, such as any groups to which contact 18 belongs, a display/nickname for contact 18, a title for contact 18, and/or the like. Regardless, contact system 32 can update the set of collaborative contacts 50 based on collaboration information 52. For example, when no collaborative contact 50 exists for contact 18, contact system 32 can create a new collaborative contact 50 to store the collaborative information 52. Alternatively, contact system 32 can add and/or modify collaborative information 52 for an existing collaborative contact 50.

Contact system 32 can index the data in the set of collaborative contacts 50 to enable efficient searching within the set of collaborative contacts 50. To this extent, in addition to the contact name and/or nickname, collaboration information 52, such as an email address, telephone number, can be indexed for ready searching. Additionally, contact system 32 can index other information on contact 18 (FIG. 1), such as a group, a title, a company, a physical address/location, etc. While discussed herein as managing a single collaborative contact 50 for each contact 18, it is understood that contact system 32 could comprise a unique collaborative contact 50 for each contact 18/collaboration tool 40 combination.

In any event, selection system 34 can search the set of collaborative contacts 50 (e.g., one or more indexes) to locate collaboration information 52 for one or more contacts 18 (FIG. 1). To this extent, user 16 can provide identifying text 54 to selection system 34. After obtaining (e.g., receiving) identifying text 54, selection system 34 can search the set of collaborative contacts 50 for identifying text 54 and generate a set of candidate contacts 56 that match identifying text 54. Subsequently, selection system 34 can generate a candidate display 60 that displays information on some or all of the set of candidate contacts 56.

Figure 3A:
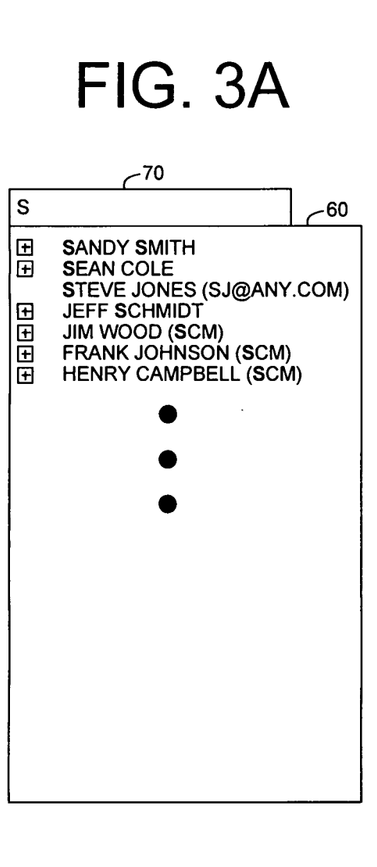
FIGS. 3A-E show an illustrative series of interfaces according to an embodiment of the invention.

In one embodiment, selection system 34 receives identifying text 54 from a text box, which enables user 16 to type in text. To this extent, selection system 34 can receive identifying text 54 in an interactive manner, e.g., as user 16 types each character in the text box. Further, selection system 34 can generate candidate display 60 for displaying at least some of the set of candidate contacts 56 adjacent to the text box. For example, FIGS. 3A-E show an illustrative series of interfaces according to an embodiment of the invention. Referring to FIGS. 2 and 3A, user can enter identifying text 54 in a text box 70. Text box 70 can comprise a user interface control in a user interface that is generated and/or displayed by selection system 34 and/or another system. Regardless, as shown, user 16 may enter a character, such as the letter "S", as identifying text 54 and selection system 34 can obtain a set of candidate contacts 56 using identifying text 54.

As noted previously, selection system 34 can search various types of information for each collaborative contact 50 in order to identify a match. For example, selection system 34 can search the contact name, email address, VoIP number, location, group(s), and/or the like, for each collaborative contact 50. Selection system 34 can use any set of rules for identifying a match, e.g., case-sensitive/insensitive, start of word/data item, data item/word chunks, and/or the like. Subsequently, selection system 34 can generate candidate display 60 for displaying the set of candidate contacts 56.

Selection system 34 can include any combination of predefined and/or user-defined data in candidate display 60. For example, candidate display 60 can display a contact name for each candidate contact 56 and/or an icon based on one or more attributes of candidate contact 56 (e.g., an icon when candidate contact 56 corresponds to an executive). Additionally, candidate display 60 can highlight (e.g., bold) the particular information in each displayed candidate contact 56 that matched identifying text 54. When the matching information does not comprise the contact name or other information displayed by default, selection system 34 also can include the particular information that resulted in the match (e.g., "SCM" group for "Jim Wood") in candidate display 60. Further, selection system 34 can sort the set of candidate contacts 56 using any known solution (e.g., number of matches, type of matching information, etc.).

Figure 3B:
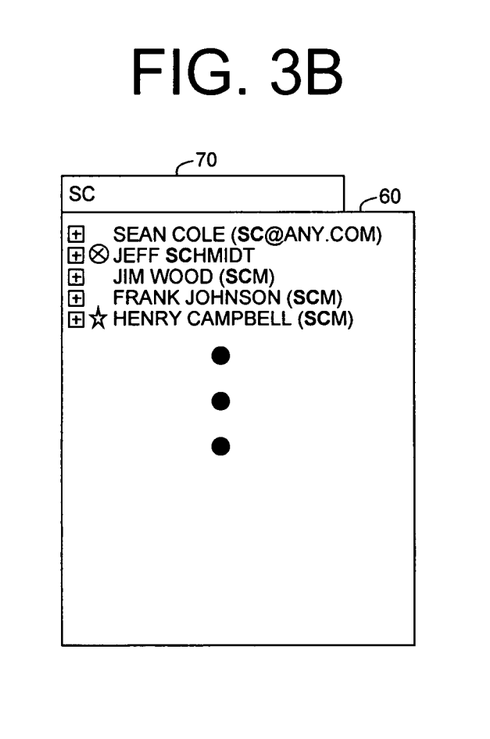
Figure 3C:
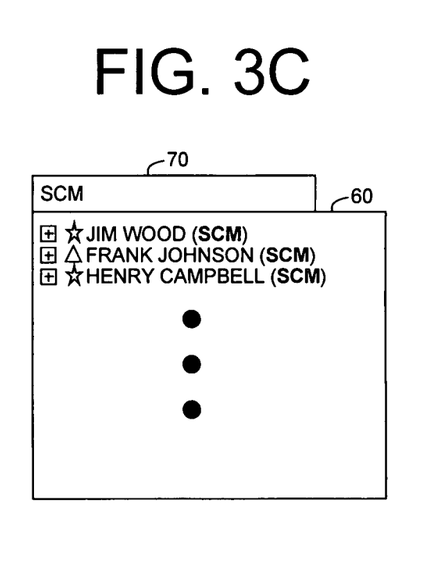

As illustrated in FIGS. 3A-C, selection system 34 (FIG. 2) can filter the set of candidate contacts 56 (FIG. 2) in a dynamic fashion. Referring to FIGS. 2 and 3A-C, user 16 can use text box 70 to enter an additional character for identifying text 54, e.g., "C" in FIG. 3B and "M" in FIG. 3C. Selection system 34 can receive the additional character and filter the set of candidate contacts 56 based on the additional character. Further, selection system 34 can update the displayed set of candidate contacts 56 in candidate display 60. To this extent, selection system 34 can resize candidate display 60, can add and/or remove information displayed for one or more candidate contacts 56, change the highlighting of text, and/or the like.

Figure 3D:
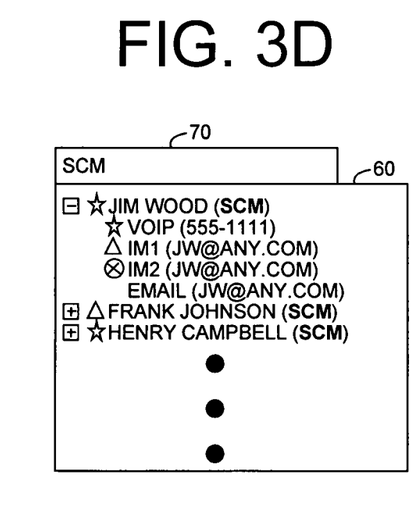

As discussed herein, each collaborative contact 50 includes a set of collaboration capabilities, each of which defines an ability to be contacted by user 16 using a particular collaboration tool 40. To this extent, selection system 34 can include some or all of the information for each collaboration capability in candidate contact 56. Further, selection system 34 can include information on the set of collaboration capabilities for each candidate contact 56 in candidate display 60. For example, as shown in FIG. 3A, candidate display 60 can include the contact information for a collaboration tool 40 when a candidate contact 56 includes a single collaboration capability (e.g., "STEVE JONES"). Further, candidate display 60 can include an expand/contract user interface control that enables user 16 to selectively display information on each collaboration capability in a hierarchical manner. For example, FIG. 3D shows display 60 after having expanded the hierarchy under the "JIM WOOD" candidate contact 56. In this case, display 60 can include both an identification of the collaboration tool 40 as well as the corresponding contact information.

Additionally, selection system 34 can include availability status information for one or more collaboration capabilities of a candidate contact 56. To this extent, status system 36 can request an availability status 58 for each collaboration capability of each candidate contact 56. In particular, status system 36 can send a request to the corresponding collaboration tool 40. The request can include, for example, the contact information in candidate contact 56 for the collaboration tool 40. Subsequently, collaboration tool 40 can use the contact information to determine availability status 58. For example, collaboration tool 40 can determine if a VoIP telephone number is busy or otherwise unavailable, determine if the corresponding individual is currently logged in to an instant messaging service, and/or the like. Collaboration tool 40 then can respond to status system 36 with availability status 58.

After receiving availability status 58, status system 36 can update the corresponding candidate contact 56. Additionally, selection system 34 can update candidate display 60 to include an indication of availability status 58. For example, selection system 34 can include an indicator icon adjacent to the contact name, which indicates a collaboration capability and/or its corresponding availability status 58. As shown in FIG. 3D, various collaboration capabilities can be assigned a unique icon (e.g., star for VoIP, triangle for IM1, and circle for IM2). For an "offline" collaboration capability such as email, availability status 58 can be assumed to be available, and no icon may be displayed since the capability is generally available. The display of each icon can be altered based on the corresponding availability status 58. For example, an icon can be "ghosted" (e.g., grayed) when availability status 58 is unknown, crossed out when availability status 58 is set as unavailable, displayed normally when availability status 58 is set as available, and/or the like. When candidate contact 56 includes multiple collaboration capabilities, selection system 34 can display an icon adjacent to the contact name for a single collaboration capability. For example, selection system 34 can rank the collaboration capabilities and display an icon that corresponds to the most preferred and/or highest available collaboration capability, user 16 could select a particular collaboration capability to be displayed, and/or the like.

As illustrated in FIGS. 3A-C, selection system 34 can update candidate display 60 in an asynchronous manner. In particular, since availability status 58 for one or more collaboration capabilities may take substantial time to receive from collaboration tool 40, selection system 34 can initially display the matching candidate contacts 56 without any availability status 58 information, and add availability status 58 information to candidate display 60 as it is received. In this manner, the responsiveness of candidate display 60 to the typing of user 16 in text box 70 can remain high, without incurring delays by waiting for one or more availability statuses 58. However, it is understood that this is only illustrative. In another embodiment, selection system 34 could generate candidate display 60 apart from text box 70. In this case, all identifying text 54 may be available prior to generating candidate display 60, and it may be desirable to wait to receive all availability status 58 information prior to providing candidate display 60 for display to user 16.

Figure 3E:
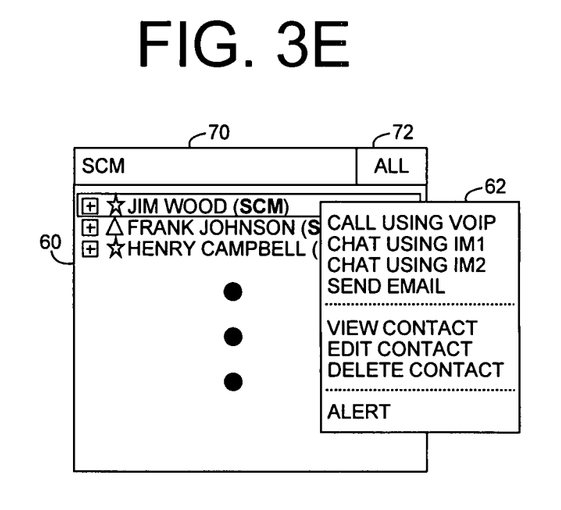
Figure 4:
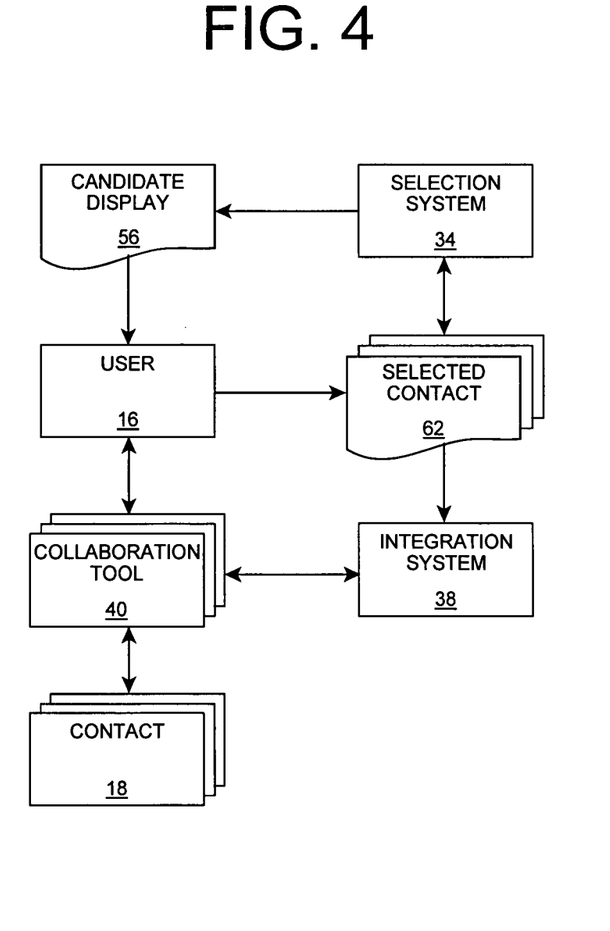
FIG. 4 shows an illustrative data flow diagram between some of the various systems shown in FIG. 1 according to an embodiment of the invention.

User 16 can use candidate display 60 to select one or more candidate contacts 56. To this extent, FIG. 4 shows an illustrative data flow diagram between some of the various systems shown in FIG. 1 according to an embodiment of the invention. Referring to FIGS. 3E and 4, user 16 can identify a set of selected contacts 62 using candidate display 60. To this extent, the set of selected contacts 62 will comprise a subset of the set of candidate contacts 56 (FIG. 2). For example, user 16 can select a single candidate contact 56 in candidate display 60 by, for example, using a mouse in a known manner. Alternatively, user 16 can select all or some of candidate contacts 56 in candidate display 60 by using a particular user interface control 72, keyboard/mouse combination, and/or the like.

Regardless, selection system 34 can receive the set of selected contacts 62 and identify one or more collaboration tools 40 for a collaboration session between user 16 and contact(s) 18 that correspond to the set of selected contacts 62. For example, selection system 34 can generate a display 62 that enables user 16 to select a particular collaboration tool 40. Additionally, display 62 can enable user 16 to perform other operations (e.g., view, edit, delete) on the collaborative contact 50 (FIG. 1) from which selected contact 62 was derived. Still further, display 62 can enable user 16 to select other type of collaborative-assisting actions, such as adding the selected contact(s) 62 to an alert list, and/or the like.

Alternatively, selection system 34 can automatically identify one or more collaboration tools 40 for the collaboration session. For example, selection system 34 can select a collaboration tool 40 based on identifying text 54 (FIG. 2). In particular, when identifying text 54 comprises at least a portion of the contact information for a particular collaboration tool 40 (e.g., a VoIP telephone number), selection system 34 can automatically select the collaboration tool 40 for the collaboration session. Further, user 16 and/or selection system 34 can rank collaboration tools 40 according to preference, and selection system 34 can automatically use the collaboration tool 40 that is ranked the highest and for which each contact 18 is available.

To this extent, selection system 34 also can identify one or more collaboration tools 40 for the collaboration session using an availability status 58 (FIG. 2) for user 16 for each collaboration tool 40. In particular, status system 36 can request availability status 58 for user 16, and receive one or more of the availability status(es) 58 from, for example, the corresponding collaboration tool 40. The availability status (es) 58 can be used to limit the choices for selection by user 16 and/or to automatically select a best available collaboration tool 40. For example, although all contacts 18 may be available for a collaboration session using a VoIP collaboration tool 40, user 16 may currently be using his/her VoIP collaboration tool 40. In this case, selection system 34 can use a next preferable (based on capability, availability, ranking, and/or the like) collaboration tool 40 for the collaboration session.

However, selection system 34 also can select multiple collaboration tools 40 for the collaboration session. For example, when a plurality of contacts 18 are desired to participate in the collaboration session, selection system 34 and/or user 16 can select a particular collaboration tool 40. For each contact 18 that cannot use the selected collaboration tool 40 (e.g., does not have the capability, unavailable status), selection system 34 can select an alternative collaboration tool 40 and integration system 38 can integrate the collaboration tools 40 for the collaboration session. For example, user 16 could use a VoIP collaboration tool 40 to collaborate with two or more contacts 18. One or more contacts 18 can be using VoIP collaboration tool 40, while one or more contacts 18 can use an instant messaging or other similar collaboration tool 40. In this case, integration system 38 can convert speech to text and text to speech and provide the converted data to the corresponding collaboration tool 40. It is understood that this is only illustrative, and various solutions for integrating two or more collaboration tools 40 could be incorporated by integration system 38.

In any event, once collaboration tool(s) 40 have been identified, selection system 34 can request a collaboration session with each selected contact 62. In particular, selection system 34 can provide contact information for each selected contact 62 to the selected collaboration tool 40 for the selected contact 62, and each collaboration tool 40 can use the contact information to initiate the collaboration session with the corresponding contact(s) 18. Once each collaboration tool 40 has contacted the corresponding contacts 18, user 16 can use his/her collaboration tool 40 conduct the collaboration session with each contact 18 with or without the assistance of integration system 38.

While shown and described herein as a method and system for managing a set of collaborative contacts 50 (FIG. 1), it is understood that the invention further provides various alternative embodiments. For example, in one embodiment, the invention provides a program product stored on a computer-readable medium, which when executed, enables a computer infrastructure to manage collaborative contact(s) 50. To this extent, the computer-readable medium includes program code, such as management system 30 (FIG. 1), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), as a data signal traveling over a network (e.g., during a wired/wireless electronic distribution of the program product), and/or the like.

In another embodiment, the invention provides a method of generating a system for managing a set of collaborative contacts 50 (FIG. 1). In this case, a computer infrastructure, such as computer infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising, and/or fee basis. That is, a service provider, such as an application service provider (ASP), could offer to manage a set of collaborative contacts 50 (FIG. 1) as described herein. In this case, the service provider can manage (e.g., create, maintain, support, etc.) a computer infrastructure, such as computer infrastructure 12 (FIG. 1), that performs the process described herein for one or more customers. In return, the service provider can receive payment from the customer(s) under a subscription and/or fee agreement and/or the service provider can receive payment from the sale of advertising to one or more third parties.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operation system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing a set of collaborative contacts, the method comprising:
   obtaining identifying text;
   obtaining a set of candidate contacts from the set of collaborative contacts using the identifying text, each candidate contact including a set of collaboration capabilities, each collaboration capability corresponding to an ability of each candidate contact to be contacted using a unique collaboration tool, wherein using the identifying text seeks a match for a name of each candidate contact and a contact information for each collaboration capability of each candidate contact;
   requesting an availability status for each collaboration capability of each candidate contact, wherein the requesting sends a request to each candidate contact's collaboration tool corresponding to the unique collaboration tool, and wherein the requesting receives the availability status from each candidate contact's collaboration tool;
   ranking the set of candidate contacts based upon the set of collaboration capabilities of each candidate contact; and
   generating a display that includes the ranked set of candidate contacts and each candidate contact's set of collaboration capabilities, an icon corresponding to a most preferred collaboration capability, and the availability status for each collaboration capability.

2. The method of claim 1, further comprising:
   obtaining an additional character for the identifying text;
   filtering the set of candidate contacts based on the additional character; and
   updating the display based on the filtering.

3. The method of claim 1, further comprising:
   obtaining a set of selected contacts, the set of selected contacts comprising a subset of the set of candidate contacts; and
   requesting a collaboration session with each selected contact in the set of selected contacts.

4. The method of claim 3, further comprising identifying at least one collaboration tool for the collaboration session.

5. The method of claim 3, further comprising conducting the collaboration session with each of the set of selected contacts.

6. The method of claim 5, the conducting including integrating a plurality of collaboration tools for the collaboration session.

7. The method of claim 1, wherein the ranking identifies a most preferred collaboration capability for each candidate contact.

8. The method of claim 1, wherein the ranking identifies a most preferred and available collaboration capability for each candidate contact.

9. A system for managing a set of collaborative contacts, the system comprising:
  a processor; and
  a memory storing a plurality of systems comprising instructions for execution on the processor, the plurality of systems including:
    a system for obtaining a set of candidate contacts from the set of collaborative contacts using the identifying text, each candidate contact including a set of collaboration capabilities, each collaboration capability corresponding to an ability of each candidate contact to be contacted using a unique collaboration tool, wherein using the identifying text seeks a match for a name of each candidate contact and a contact information for each collaboration capability of each candidate contact;
    a system for requesting an availability status for each collaboration capability of each candidate contact, wherein the requesting sends a request to each candidate contact's collaboration tool corresponding to the unique collaboration tool, and wherein the requesting receives the availability status from each candidate contact's collaboration tool;
    a system for ranking the set of candidate contacts based upon the set of collaboration capabilities of each candidate contact; and
    a system for generating a display that includes the ranked set of candidate contacts and each candidate contact's set of collaboration capabilities, an icon corresponding to a most preferred collaboration capability, and the availability status for each collaboration capability.

10. The system of claim 9, wherein the plurality of systems further comprises:
  a system for receiving collaboration information on a collaborative contact from a collaboration tool; and
  a system for updating the set of collaborative contacts based on the collaboration information.

11. The system of claim 9, wherein the plurality of systems further comprises:
  a system for obtaining a set of selected contacts, the set of selected contacts comprising a subset of the set of candidate contacts;
  a system for identifying at least one collaboration tool for the collaboration session; and
  a system for requesting a collaboration session with each selected contact in the set of selected contacts.

12. The system of claim 11, wherein the plurality of systems further comprises a system for conducting the collaboration session with each of the set of selected contacts.

13. The system of claim 12, the system for conducting including a system for integrating a plurality of collaboration tools for the collaboration session.

14. The system of claim 9, wherein the plurality of systems further comprises a system for obtaining identifying text, the system for obtaining using the identifying text.

15. A program product stored on a non-transitory computer-readable medium, which when executed, enables a computer infrastructure to manage a set of collaborative contacts, the program product comprising computer program code for enabling the computer infrastructure to:
  obtain identifying text for the collaborative contact;
  obtain a set of candidate contacts from the set of collaborative contacts using the identifying text, each candidate contact including a set of collaboration capabilities, each collaboration capability corresponding to an ability of each candidate contact to be contacted using a unique collaboration tool, wherein using the identifying text seeks a match for a name of each candidate contact and a contact information for each collaboration capability of each candidate contact;
  request an availability status for each collaboration capability of each candidate contact, wherein the requesting sends a request to each candidate contact's collaboration tool corresponding to the unique collaboration tool, and wherein the requesting receives the availability status from each candidate contact's collaboration tool;
  rank the set of candidate contacts based upon the set of collaboration capabilities of each candidate contact; and
  generate a display that includes the ranked set of candidate contacts and each candidate contact's set of collaboration capabilities, an icon corresponding to a most preferred collaboration capability, and the availability status for each collaboration capability.

16. The program product of claim 15, further comprising computer program code for enabling the computer infrastructure to:
  obtain a set of selected contacts, the set of selected contacts comprising a subset of the set of candidate contacts;
  identify at least one collaboration tool for a collaboration session; and
  request the collaboration session with each selected contact in the set of selected contacts.

17. The program product of claim 16, further comprising computer program code for enabling the computer infrastructure to conduct the collaboration session with each of the set of selected contacts.

18. A method of generating a system for managing a set of collaborative contacts, the method comprising:
  providing a computer infrastructure operable to:
    obtain identifying text;
    obtain a set of candidate contacts from the set of collaborative contacts using the identifying text, each candidate contact including a set of collaboration capabilities, each collaboration capability corresponding to an ability of each candidate contact to be contacted using a unique collaboration tool, wherein using the identifying text seeks a match for a name of each candidate contact and a contact information for each collaboration capability of each candidate contact;
    request an availability status for each collaboration capability of each candidate contact, wherein the requesting sends a request to each candidate contact's collaboration tool corresponding to the unique collaboration tool, and wherein the requesting receives the availability status from each candidate contact's collaboration tool;

rank the set of candidate contacts based upon the set of collaboration capabilities of each candidate contact; and generate a display that includes the ranked set of candidate contacts and each candidate contact's set of collaboration capabilities, an icon corresponding to a most preferred collaboration capability, and the availability status for each collaboration capability.

* * * * *